US010102355B2

United States Patent
Ahmed et al.

(10) Patent No.: US 10,102,355 B2
(45) Date of Patent: Oct. 16, 2018

(54) OPTIMIZED ENFORCEMENT OF FINE GRAINED ACCESS CONTROL ON DATA

(71) Applicant: Oracle International Corporation, Redwood Shores, CA (US)

(72) Inventors: Tanvir Ahmed, Hayward, CA (US); Yi Ru, Belmont, CA (US); Chao Liang, San Ramon, CA (US); Vikram R. Pesati, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 818 days.

(21) Appl. No.: 14/313,872

(22) Filed: Jun. 24, 2014

(65) Prior Publication Data

US 2015/0371018 A1    Dec. 24, 2015

(51) Int. Cl.
*G06F 21/30*        (2013.01)
*G06F 17/30*        (2006.01)
*G06F 21/62*        (2013.01)

(52) U.S. Cl.
CPC ........ *G06F 21/30* (2013.01); *G06F 17/30448* (2013.01); *G06F 21/6218* (2013.01); *G06F 21/6227* (2013.01); *G06F 2221/2141* (2013.01)

(58) Field of Classification Search
CPC .. G06F 21/30; G06F 21/6218; G06F 21/6227; G06F 17/30448; G06F 2221/2141
See application file for complete search history.

(56) References Cited

U.S. PATENT DOCUMENTS

| 9,043,309 | B2 * | 5/2015 | Ahmed ............. G06F 17/30448 707/713 |
| 2003/0187848 | A1 | 10/2003 | Ghukasyan et al. |
| 2003/0212670 | A1 * | 11/2003 | Yalamanchi ........ G06F 17/2241 |
| 2005/0246338 | A1 * | 11/2005 | Bird .................... G06F 21/6227 |

(Continued)

FOREIGN PATENT DOCUMENTS

EP    1564620 A1    1/2005

OTHER PUBLICATIONS

U.S. Appl. No. 13/488,739, filed Jun. 5, 2012, Notice of Allowance dated Aug. 28, 2014.

*Primary Examiner* — Michael Pyzocha
(74) *Attorney, Agent, or Firm* — Hickman Palermo Becker Bingham LLP; Daniel D. Ledesma (57) ABSTRACT

Techniques for efficient cursor sharing to enforce fine-grained access control are provided. In one technique, the authorization context of a database statement is stored in (or in association with) a corresponding cursor. The authorization context indicates multiple authorization results, each of which indicates whether a user (or role) associated with the database statement is allowed to access a different data set of multiple data sets that the database statement targets. An authorization context of an incoming database statement may be compared to the authorization context of a cursor in a single comparison to determine whether the authorization contexts match. If so, then the cursor may be shared. In another technique, one or more normalizations are applied to a cursor predicate that is generated based on the authorization context of a database statement. The one or more normalizations may result in removing one or more predicates from the cursor predicate.

19 Claims, 3 Drawing Sheets

(56) References Cited

U.S. PATENT DOCUMENTS

| | | | |
|---|---|---|---|
| 2008/0071785 A1* | 3/2008 | Kabra | G06F 17/30306 |
| 2008/0168529 A1* | 7/2008 | Anderson | G06F 21/577 |
| | | | 726/1 |
| 2009/0182747 A1* | 7/2009 | Bird | G06F 21/6227 |
| 2009/0276824 A1* | 11/2009 | Rafiq | G06F 21/604 |
| | | | 726/1 |
| 2010/0036846 A1* | 2/2010 | Rafiq | G06F 17/30306 |
| | | | 707/783 |
| 2011/0208757 A1* | 8/2011 | Hung | G06F 17/30442 |
| | | | 707/752 |
| 2012/0330925 A1* | 12/2012 | Ramamurthy | G06F 17/30448 |
| | | | 707/718 |
| 2013/0117313 A1* | 5/2013 | Miao | G06F 21/6227 |
| | | | 707/781 |
| 2013/0238659 A1* | 9/2013 | Roitman | G06F 21/6227 |
| | | | 707/781 |
| 2013/0325841 A1* | 12/2013 | Ahmed | G06F 17/30448 |
| | | | 707/713 |
| 2014/0188938 A1* | 7/2014 | Banks | G06F 21/6227 |
| | | | 707/783 |
| 2015/0020147 A1* | 1/2015 | Krishnan | G06F 21/6218 |
| | | | 726/1 |
| 2018/0060603 A1 | 3/2018 | Ahmed | |

\* cited by examiner

OPTIMIZED ENFORCEMENT OF FINE GRAINED ACCESS CONTROL ON DATA

FIELD OF THE DISCLOSURE

The present disclosure relates to fine-grained access control and, more specifically, to efficiently creating and sharing cursors in light of a data security policy on a database object.

BACKGROUND

Access Control

Access control is the process of deciding who can use specific systems, resources, and applications. An access control model is a defined set of criteria a system administrator utilizes to define system users' rights. One popular access control model is Role Based Access Control (RBAC). RBAC involves creating permissions by assigning access rights to specific roles or jobs within the company and then assigning users to those roles, thereby granting privileges.

Authorization state of an access control model may be represented by the triple {S, O, A}, where S is the set of identity context of entities requesting access, O is the set of target resources, and A is the access matrix, where A[s,o] is the privilege for which subject s is authorized on object o. In the context of a database system, S represents database users and their respective DB roles, O is the set of database tables and views, and values of A are database object privileges, such as select, insert, update, and delete.

One approach for implementing access control in a database system involves extending the database access control model in all three dimensions. With respect to identity context S, this approach allows a subject to be any user or identity context, including a large number of application end-users and application roles. With respect to the set of target resources O, this approach allows fine-grained objects where a subset of the cells of a table or view can be defined as a protected resource. With respect to access matrix A, this approach allows new privileges to be defined to represent application-level actions on objects. This virtually unbounded and large number of subjects, objects, and privileges result in an extremely large number of authorization states. For ease of access control policy specification, this approach uses "negative grant" or "deny" that allows deny of a subset of access rights from a larger set of access rights. The use of deny (or negative privilege grants) further increases the number of authorization states. Correspondingly, this approach introduces new challenges on how authorization state can be managed during runtime for efficient authorization decisions.

Cursor Sharing

Access control enforcement on data stored in a database is tied to query execution that accesses the data. Interpretive languages, such as SQL, require compilation before each execution. The compilation phases of a SQL statement include syntax check, type check, object access check, semantics analysis, execution plan generation and optimization, and finally creation of one or more runtime data structures. This compilation process is referred to as a "hard parse" and one of the generated data structures is referred to as a "cursor", which contains the execution plan. Because hard parses are so computationally expensive, there is a desire to share the resulting cursors with subsequent identical or equivalent SQL statements.

One or more "cursor sharing criteria" are used to determine whether a cursor may be shared by the same database statement submitted by different users. The process of checking cursor sharing criteria is referred to as a "soft parse." One cursor sharing criterion may be whether the user or entity that submitted the database statement is authorized to access the objects indicated in the database statement. Without the approach that extends the database access control model ("extended model approach") described previously, such an authorization check is limited to object privileges on the table (or view). With the extended model approach and its associated fine-grained access control, this authorization check may need to be performed on each row and column of an object based on the privileges being checked as part of the database statement.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for efficient cursor sharing to enforce fine-grained access control are provided. In one technique, the authorization context of a database statement is stored in a corresponding cursor. The authorization context indicates multiple authorization results, each of which indicates whether a user associated with the database statement is allowed to access a different data set of multiple data sets that the database statement targets. An authorization context of an incoming database statement may be compared to the authorization context of a cursor in a single comparison to determine whether the authorization contexts match. If so, then the cursor may be shared.

In another technique, one or more normalizations are applied to a cursor predicate that is generated based on the authorization context of a database statement. The one or more normalizations may result in removing one or more predicates from the cursor predicate.

In another technique, one or more privilege predicates are identified as unnecessary and are therefore eliminated, which reduces the size of the final rewrite of a database statement.

Overview of Data Access Control Policies

A data access control policy providing row-level access control to data stored in a database may be specified using one or more access control lists. Each access control list specifies what privileges (e.g., read or update) can be performed by which principals, where each principal is a user or role in the database system. A role is a defined grouping of one or more principals in the database system. In addition to specifying what privileges are granted to particular principles, privileges may also be explicitly denied to one or more principals in an access control list.

In order to specify what privileges are granted or denied to particular principals, each access control list includes one or more access control entries that define a mapping from a principal to a granted or denied privilege. For example, an access control entry may specify that a first user is granted access to read, while another entry may specify that users in a defined "marketing" role are denied the privilege to update data. Thus, each access control entry may specify at least a particular privilege, a value indicating whether the privilege is granted or denied, and a principal.

Access control lists are associated with particular rows, columns, or other subset of a database table by a condition or predicate that specifies the data set to which each access control list is applicable, referred to herein as "access predicates." An access predicate may be specified, for example, as a Structured Query Language (SQL) expression or any other suitable expression for identifying a subset of a database table. The data referred to by an access predicate is referred to herein as a "data realm." The association between a data realm and an access control list is referred to herein as an "ACL-data realm pair." Each row of a table may have associated with it one or more data realms. A data access control policy is a collection of one or more ACL-data realms pairs that define the access privileges to particular principals to particular subsets of one or more database tables.

When a principal submits a query to a database server, the database server enforcing a data access control policy determines whether a table identified by the query is associated with one or more ACL-data realm pairs. If the database server determines that the query identifies such a table, during query execution the database server will evaluate the ACL-data realm pairs associated with the table for each row requested in the query. If an ACL-data realm pair includes an access control list that either grants or denies the requested privilege to the requesting principal and the associated access predicate is true for the current row under evaluation, then access to the row is granted or denied to the principal. If all of the ACL-data realm pairs are evaluated without an explicit grant or deny result, then access to the row may be denied to the principal by default.

If a row under evaluation is associated with more than one ACL-data realm pair, then the result of the access control evaluation may depend on the order in which the ACL-data realm pairs are evaluated. For example, a first ACL-data realm pair may specify, relative to a table T containing a column col1, an access predicate of col1<2. A second ACL-data realm pair may specify, relative to the same table, an access predicate of col1<3. Thus, the access predicate of the first data realm and the access predicate of the second data realm would both be satisfied by a row of table T containing the value 1 in the col1 column. However, the first ACL and the second ACL may have different or even conflicting privilege grants for a particular principal. For example, the first ACL may specify that a particular user is granted the privilege to read. The second ACL may specify exactly the opposite, i.e., that the user is denied the privilege to read. Thus, the privilege that is granted to the user for a row that satisfies the access predicates for both data realms will depend on the order in which the associated ACLs are evaluated.

If a table has more than one ACL-data realm pair associated with it, then the ACL-data realm pairs are evaluated for each row in an order defined as part of the data security policy. For example, an ordered set of ACL-data realm pairs requiring evaluation may be specified as:

a1, C1, a2, C2, . . . , aN, CN, where each of a1-aN represents a particular ACL, and each of C1-CN represents a data realm that is associated with a respective ACL.

When a database server receives a query that requests access to rows of a table associated with a data security policy, the data security policy may be specified as part of the query in an access check query operator. For example, the policy evaluation logic for the data security policy described above, relative to a particular principal submitting a query, may be specified by the following example access check operator:

CHECK_PRIVILEGE(p, a1, C1, a2, C2, . . . , aN, CN), where CHECK_PRIVILEGE is the access check operator and takes as parameters the privilege p and the ordered set of ACL-data realm pairs a1, C1, a2, C2, . . . , aN, CN.

Thus, in order for a privilege p to have access to the requested data in a table associated with the data security policy specified above, the policy evaluation logic specified by the access check operator should return true for all rows requested for the privilege. The ACLs associated with the data security policy are evaluated in the specified order for each requested row. If an evaluated ACL either grants or denies the checked privilege and the associated condition holds for the row, then access to the row is granted or denied, respectively, to the principal who is executing the query. If the evaluation logic for a particular row reaches the end of the list of ACL-data realm pairs without a result, then access to the row is denied.

In an embodiment, the access check operator is included as part of the query submitted by the principal during the query compilation process. For example, in response to receiving the query SELECT*FROM T, a database server may append an access check operator to the query during query compilation, resulting in the query expression:

SELECT*FROM T WHERE CHECK_PRIVILEGE(p, a1, C1, a2, C2, . . . , aN, CN).

Thus, the CHECK_PRIVILEGE access check operator will be used by the database server to control access to the requested rows of database table T for the user who is executing the query.

During the compilation process, the result of an access check operator may be one or more predicates that are added to the database statement. Each predicate corresponds to an authorization result of one of the corresponding ACLs. A privilege check against an ACL may result in three different results: grant (G), deny (D), or neither grant nor deny (N).

For example, if there are two ACL-data realm pairs, the first data realm is defined by "col1>10", the second data realm is defined by "col2<20", and the authorization result of each ACL is a grant, then the above query expression may be rewritten as:

SELECT*FROM T WHERE col1>10 OR col2<20

Thus, if a row from table T satisfies either condition, then that row will be part of the query result. As another example, if there are two ACL-data realm pairs, the first data realm is defined by "col1>10", the second data realm is defined by "col2<20", the authorization result of the first ACL is a deny, and the authorization result of the second ACL is a grant, then the above query expression may be rewritten as:

SELECT*FROM T WHERE !(col1>10) AND col2<20

Thus, a row from table T must satisfy both conditions in order for that row to be part of the query result.

In an embodiment, the CHECK_PRIVILEGE operator may also include multiple privileges, including object privileges, such as:

CHECK_PRIVILEGE ({p1, ..., pM}, a1, C1, ..., aN, CN)

where "p1, ..., pM" are privileges.

For each privilege and N ACL-data realm pairs, there are $3^N$ possible authorization contexts, each of which indicates an authorization result for each ACL-data realm pair relative to the requested privilege. For M privileges, there are $M*3^N$ possible authorization contexts.

A data security policy is enforced based on the access (or data realm) predicates of an authorization context. A grant (G) on an ACL results in ORing the corresponding data realm predicate with the remaining data realm predicate(s). A deny (D) on an ACL results in inverting the corresponding data realm predicate and ANDing the inverted predicate with the remaining data realm predicate(s). A neither grant nor deny (N) results in not using the data realm predicate. In other words, nothing about that data realm predicate is added to the rewrite. That data-realm predicate is effectively skipped and the authorization result of the next ACL-data realm pair is considered. After the authorization results of all ACL-data realm pairs are considered, a FALSE predicate (e.g., 1=0) is added as the termination condition of any previous relations (AND or OR). This last FALSE also signifies that, if at the end nothing is granted, then the final result is deny or no rows.

The process of rewriting a query to include multiple data realm predicates is performed left to right, assuming that the ACL-data realm pairs are ordered from left to right based on priority. After an authorization result of evaluating the last ACL is generated and the corresponding data realm predicate is added to the rewritten query, if the data realm ACL pairs do not grant access to any rows, then the final result is a FALSE predicate (1=0).

As there can be a large number of authorization contexts after compiling numerous database statements, there can be a large number of corresponding child cursors or SQL rewrites.

Consider the following table showing four possible SQL rewrites where there are two ACL-data realm pairs, a single privilege, and the SQL rewrites with ACL grants involved for the rewrites are shown:

TABLE A

| Result of a1 | Result of a2 | SQL Rewrite |
| --- | --- | --- |
| D | D | !C1 AND (!C2 AND FALSE) |
| D | N | !C1 AND FALSE |
| N | D | ! C2 AND FALSE |
| N | N | FALSE |

The following table shows a single SQL rewrite in a similar scenario except that there are two privilege checks and only deny authorization results are shown:

TABLE B

| Result a1, p1 | Result a2, p1 | Result a1, p2 | Result a2, p2 | SQL Rewrite |
| --- | --- | --- | --- | --- |
| D | D | D | D | (!C1 AND (!C2 AND FALSE)) AND (!C1 AND (!C2 AND FALSE)) |

A challenge is to reduce these rewrites and maintain the multiple authorization contexts for a final child cursor.

Query Rewrite and Optimization

When a database server receives a database statement (or query), the database system performs a series of steps of translation, semantic analysis, rewriting, and optimization before executing the query. Each step of the query transformation may result in a re-formed representation of the query. Alternatively, the database system may represent the transformed query as in-memory data structures at one or more steps of the query transformation. The next sections describe query rewrites that are relevant to the techniques described herein.

After receiving a query, a database server performs one or more steps of query parsing and semantic analysis on the query during the query compilation process. In performing semantic analysis upon the query, the database server generates an internal representation of the query. After the internal representation of the query has been generated, part of the semantic analysis will include the database server determining whether one or more of the tables specified in the query expression are associated with a data security policy. In response to determining that the one or more of the tables specified in the query are associated with a data security policy, the database server rewrites the query to include an access check operator, as described above.

Cursor Sharing in Access Control Context

As noted previously, the number of possible authorization contexts that may be generated for different instances of the same database statement (due to different users or roles associated with different instances and the number of ACL-data realm pairs for a database object) may be very large. In the case of a single privilege and N ACL-data realm pairs, there are $3^N$ possible authorization contexts. Thus, for five ACL-data realm pairs, there are 243 possible authorization contexts.

One way in which to identify a cursor to share is to store a tree-like structure that is used during a sharing check process. One step in cursor sharing is to compare an incoming database statement with a database statement associated with each of one or more parent cursors to identify a database statement that is identical or equivalent to the incoming database statement. Each parent cursor is associated with a different database statement and is associated with one or more child cursors. Thus, each child cursor of a parent cursor is associated with the same database statement as each other child cursor of the same parent cursor.

Figure 1:
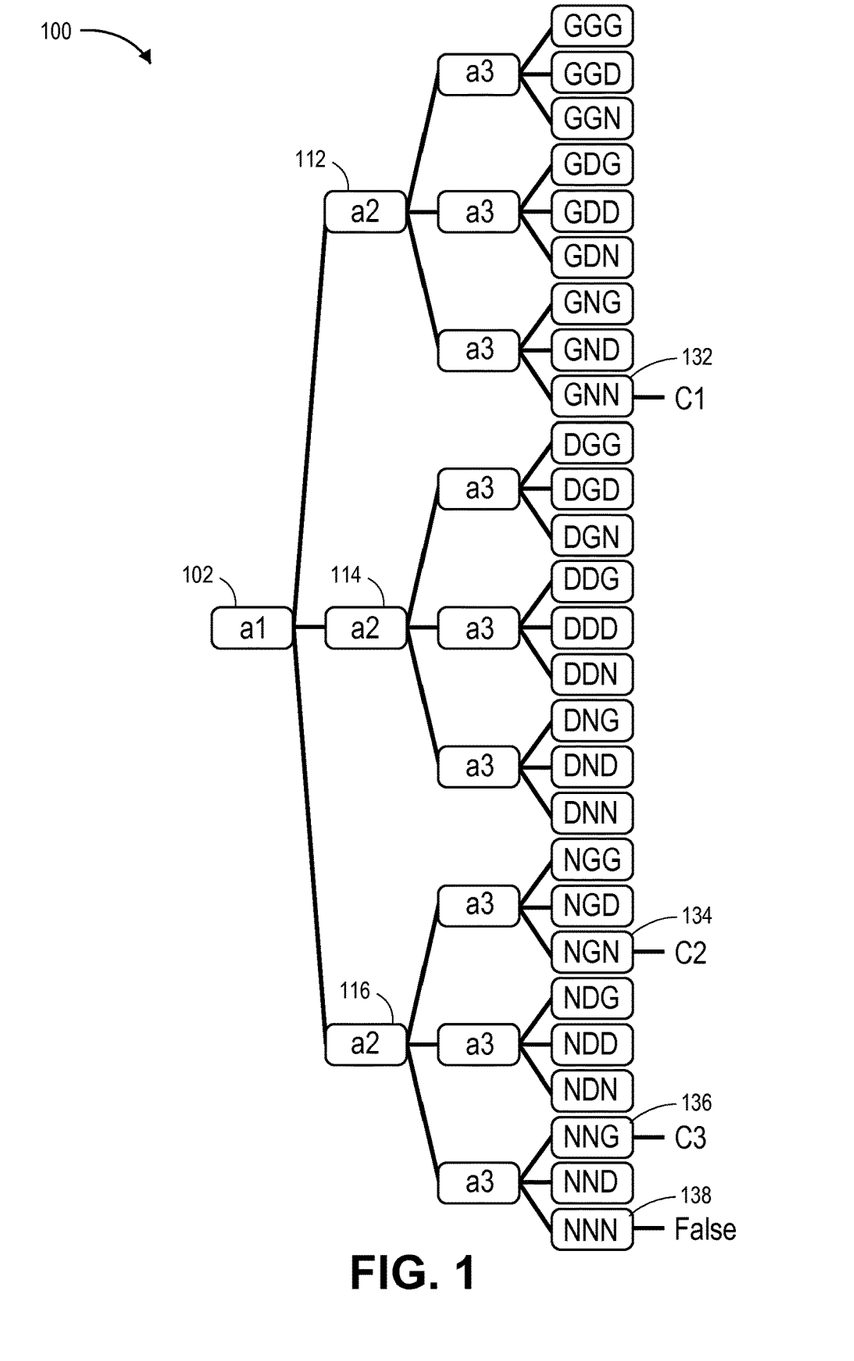
FIG. 1 is a block diagram that depicts an example tree structure 100 for checking cursor sharing criteria.

FIG. 1 is a block diagram that depicts an example tree structure 100 for checking sharing criteria for three ACL-data realm pairs. Tree structure 100 includes 27 leaf nodes, each corresponding to a different authorization context.

Each level in tree structure 100 corresponds to a different ACL-data realm pair. The first level corresponds to the first ACL-data realm pair, the second level corresponds to the second ACL-data realm pair, and so forth. Each level is treated as a different cursor sharing criterion in order to locate the appropriate child cursor.

At the first level, node 102 corresponds to a check to determine the authorization result (generated based on a current database statement) of the first ACL-data realm pair. (The label 'a1' in node 102 refers to the ACL of the first ACL-data realm pair.) If that result is a grant (G), then node 112 (in the second level of tree structure 100) is accessed. Alternatively, if the authorization result is a deny (D), then node 114 (also in the second level of tree structure 100) is accessed. Alternatively, if the authorization result is neither a grant nor deny (N), then node 116 is accessed.

After a second-level node in tree structure 100 is accessed, the authorization result of the second ACL-data realm pair is determined. (The label 'a2' in nodes 112-116 refers to the ACL of the second ACL-data realm pair.) That authorization result is used to access the appropriate node in the third level of tree structure 100.

After a third-level node in tree structure 100 is accessed, the authorization result of the third ACL-data realm pair is determined. (The label 'a3' in the third-level nodes refers to the ACL of the third ACL-data realm pair.) That authorization result is used to access the appropriate leaf node in tree structure 200. Leaf nodes of tree structure 100 include leaf nodes 132-138.

Thus, such a tree structure requires the storage and management of $(3^{N+1}-1)/2$ internal tree nodes and N comparisons to find the appropriate child cursor (where N is the number of ACL-data realm pairs).

However, with the observations that: (1) negative grants (i.e., deny results) are used in exceptional access control rules and, thus, are rarely used; (2) all combination of grants from different ACL-data realm pairs is unlikely in a real application; and (3) access to each data realm is usually controlled by a privilege (e.g., selecMyPurchaseOrders, viewMyRecords) that is a unique to specific data realms for the object, there are two common cases for the authorization context.

In the first case, each data realm is associated with a unique privilege that is granted in the associated ACL. For example, privilege p1 is used to access rows in C1, privilege p2 for rows in C2, and privilege p3 for rows in C3. In this case, each database (e.g., SQL) statement is executed primarily to enforce one of these three privileges. For example, to enforce privilege p1, a SQL statement might be:

select*from Table T where ORA_CHECK_ACL(ORA_GET_ACLIDS(T), p1);

This SQL statement may result in only 2 cursors. Either privilege p1 is granted for a1 or not, resulting in two data realm predicates: C1 or False (e.g., 1=0).

In the second case, each ACL is associated with the same privilege but granted to different roles or users. This situation arises when an object privilege (e.g., select, insert, update, or delete) is checked. In this case, there are only four most common outcomes. For example, for the select privilege, the executing user is granted that privilege in one of the three ACLs (a1, a2, or a3) resulting in the following four data realm predicates: C1, C2, C3, or False. In tree structure 100, these four common outcomes are reflected in leaf nodes 132-138.

From these two common cases, there are about N common authorization contexts as opposed to $3^N$ authorization contexts (where N is the number of ACL-data realm pairs for a targeted database object).

Efficient Cursor Sharing Technique

In light of the foregoing, an embodiment involves storing the entire authorization context of a database statement in (or in association with) a child cursor and comparing that authorization context to the authorization context of an incoming database statement to determine whether the child cursor may be shared. Such a comparison may be performed in a single comparison operation. Thus, storing and managing a tree-like structure for applying cursor sharing criteria is avoided. Also, multiple comparisons (i.e., one for each ACL-data realm pair), one for each level of tree structure, may be avoided.

Instead of comparing authorization contexts to determine whether a child cursor may be reused, rewrite predicates may be compared. For example, a rewrite predicate may be generated by a query compiler based on the access check operator and one or more parameters of the operator. The rewrite predicate may then be stored with a cursor. Later, a rewrite predicate may be generated for an incoming database statement and compared with the rewrite predicate of a child cursor to determine whether the rewrite predicates match. However, there are multiple disadvantages to that approach. First, rewrite predicates may be very long and, thus, storing rewrite predicates in cursor cursors may significantly increase cursor storage or limit the number of cursors that may be stored for reuse. Authorization contexts may be significantly smaller than a long character string of a rewrite predicate. Second, significant computational resources are required to generate a rewrite predicate. Comparing authorization contexts allows a query compiler to avoid generating rewrite predicates for incoming database statements that may reuse cursors.

In an embodiment, the authorization context of a cursor may be stored as a bit vector, where a set of bits within the bit vector corresponds to an authorization result. For example, two bits may indicate whether an authorization result is a grant (G), a deny (D), or neither (N). For example, two '1' bits indicates a G, two '0' bits indicates a D, and a '1' following by a '0' indicates a N. Thus, if there are four ACL-data-realm pairs for a database object, then an authorization context for a database statement that targets the database object may be 8 bits or (1 byte).

If an authorization context of an incoming (i.e., not yet executed) database statement does not match the authorization context of a child cursor, then the next child cursor in a child cursor list (if there are any left to check) is examined to identify its authorization context. If a match is found, then the corresponding child cursor may be used to execute the database statement. (The matching of authorization contexts may be a necessary, but not sufficient condition for sharing cursors. There may be other sharing criteria that must be checked before it is determined that a child cursor may be shared.) Else, a hard parse will be performed and the resulting child cursor may be added to the child cursor list.

Figure 2:
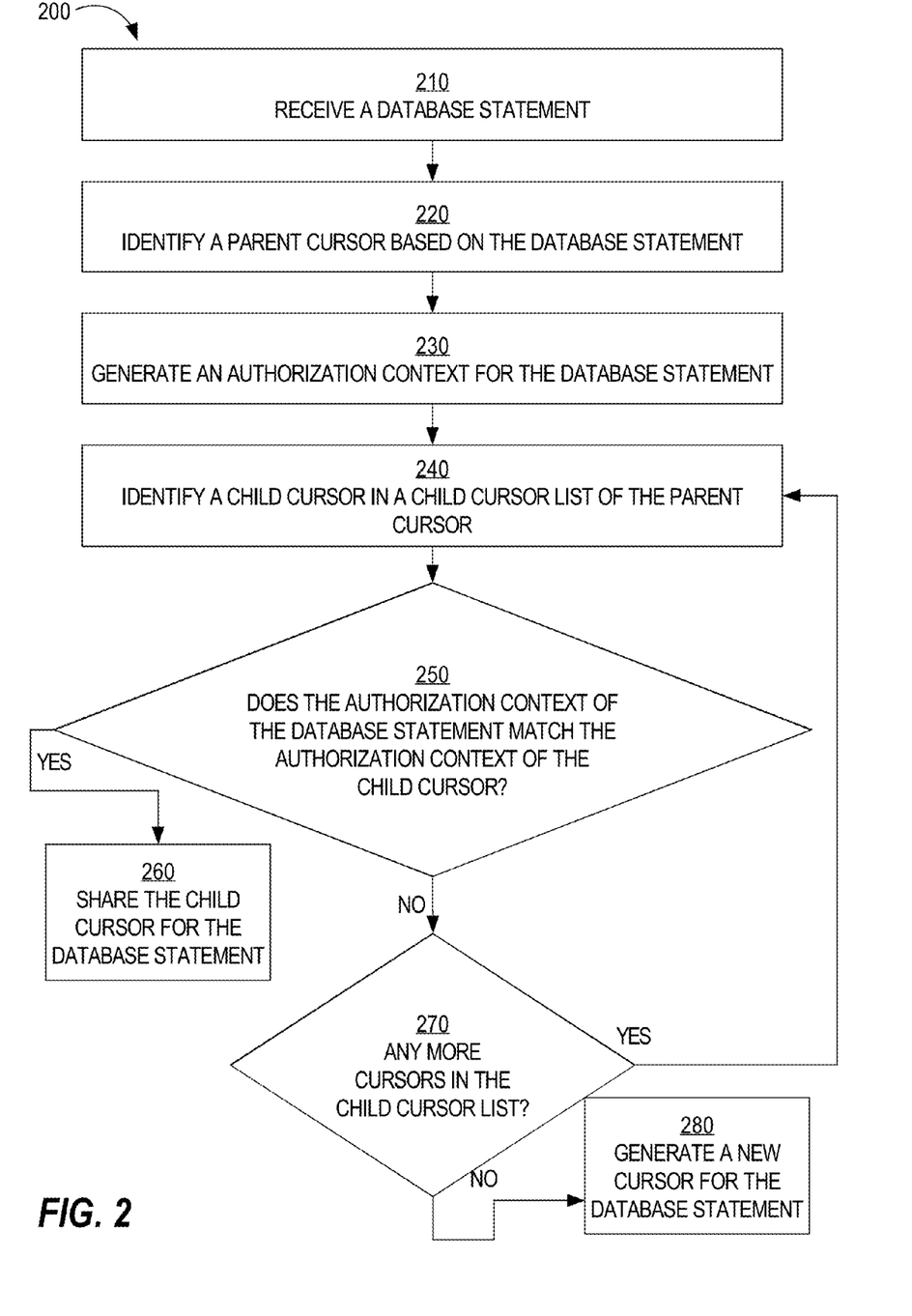
FIG. 2 is a flow diagram that depicts a process for sharing child cursors, in an embodiment.

FIG. 2 is a flow diagram that depicts a process 200 for sharing compiled cursors, in an embodiment.

At block 210, a database statement is received. The database statement is associated with a principal (i.e., a user and/or set of one or more roles) that is assigned (directly and/or indirectly) one or more privileges.

At block 220, a parent cursor is identified for a database statement. There may be many parent cursors, each associated with a different database statement and each associated with a different child cursor list of one or more cursors.

The identified parent cursor is associated with (or includes) a database statement that matches the received database statement. Two database statements match if they are identical or equivalent. An example of equivalent database statements is where only the bind values of the respective database statements are different.

The database statements that are matched may be original database statements. Alternatively, one or both of the database statements may have been rewritten (e.g., normalized) in some fashion (but still equivalent to the original database statement from which it was rewritten).

While it is assumed in process 200 that a parent cursor is identified, in some cases, a parent cursor may not be identified. In such cases, process 200 would proceed to block 280, where a "hard parse" is performed.

At block 230, an authorization context is generated for the received database statement (which may be in a rewritten or normalized form). The authorization context indicates multiple authorization results, one for each of multiple ACL-data realm pairs associated with a database object that the database statement targets. Each authorization result is determined based on the privilege requested in the database statement and the user (and/or one or more roles assigned to the user) that initiated (or submitted) the database statement.

At block 240, a child cursor in a child cursor list of the parent cursor is identified.

At block 250, it is determined whether the authorization context of the received database statement matches the authorization context of the child cursor. If so, then, process 200 proceeds to block 260. Otherwise, process 200 process proceeds to block 270.

At block 260, the child cursor is "shared" or used to execute the received database statement. This is referred to as a "soft" parse. Thus, a "hard" parse is avoided.

At block 270, it is determined whether there are any child cursors in the child cursor list that have not yet been checked. If so, then process 200 proceeds to 240. Otherwise, process 200 proceeds to block 280.

At block 280, the database statement is compiled and a new cursor is generated. In other words, a hard parse is performed relative to the database statement.

While process 200 is depicted and described as proceeding in a particular order, embodiments may vary in this regard. For example, block 240 may occur prior to block 230 and block 230 may occur prior to block 220.

Predicate Normalization

The following table shows all possible cursor rewrites and permutations of authorization results where there are three ACL-data realm pairs:

TABLE C

| Row num | Result of a1 | Result of a2 | Result of a3 | Cursor Predicate |
|---|---|---|---|---|
| 1 | G | G | G | C1 OR (C2 OR (C3 OR False)) |
| 2 | G | G | D | C1 OR (C2 OR (!C3 AND False) |
| 3 | G | G | N | C1 OR (C2 OR (False)) |
| 4 | G | D | G | C1 OR (!C2 AND (C3 OR False) |
| 5 | G | D | D | C1 OR (!C2 AND (!C3 AND False) |
| 6 | G | D | N | C1 OR (!C2 AND (False)) |
| 7 | G | N | G | C1 OR (C3 OR False) |
| 8 | G | N | D | C1 OR (!C3 AND False) |
| 9 | G | N | N | C1 OR False |
| 10 | D | G | G | !C1 AND (C2 OR (C3 OR False)) |
| 11 | D | G | D | !C1 AND (C2 OR (!C3 AND False) |
| 12 | D | G | N | !C1 AND (C2 OR (False)) |
| 13 | D | D | G | !C1 AND (!C2 AND (C3 OR False)) |
| 14 | D | D | D | !C0 AND (!C2 AND (!C3 AND False))) |

TABLE C-continued

| Row num | Result of a1 | Result of a2 | Result of a3 | Cursor Predicate |
|---|---|---|---|---|
| 15 | D | D | N | !C1 AND (!C2 AND False) |
| 16 | D | N | G | !C1 AND (C3 OR False) |
| 17 | D | N | D | !C1 AND (!C3 AND False) |
| 18 | D | N | N | !C1 AND False |
| 19 | N | G | G | C2 OR (C3 OR Flase) |
| 20 | N | G | D | C2 OR (!C3 AND False) |
| 21 | N | G | N | C2 OR False |
| 22 | N | D | G | !C2 AND (C3 OR False) |
| 23 | N | D | D | !C2 AND (!C3 AND False) |
| 24 | N | D | N | !C2 AND False |
| 25 | N | N | G | C3 OR False |
| 26 | N | N | D | !C3 AND False |
| 27 | N | N | N | False |

Thus, there are 27 distinct cursor rewrites (which correspond to different child cursors) and authorization contexts (not shown).

As noted previously, a grant (G) in an ACL of a data realm predicate is rewritten as ORing of the data realm predicate with any remaining predicates, a deny (D) in an ACL of a data realm predicate is rewritten as an inverted data realm predicate and ANDing it with any remaining predicates, and a neither grant nor deny (N) in an ACL of a data realm predicate results in not using the data realm predicate. Also, the termination condition of a rewrite is a False.

In an embodiment, one or more normalizations are applied to some of the cursor rewrites (or predicates) that are generated based on the authorization results associated with a database statement. If such normalizations are applied to the predicates in Table C, then a result of the normalizations is shown in the following table:

TABLE D

| Row num | Result of a1 | Result of a2 | Result of a3 | Cursor Predicate | Final Authorization Context |
|---|---|---|---|---|---|
| 1 | G | G | G | C1 OR C2 OR C3 | GGG |
| 2 | G | G | D, N | C1 OR C2 | GG_ |
| 3 | G | D | G | C1 OR !C2 AND C3 | GDG |
| 4 | G | D, N | D, N | C1 | G__ |
| 5 | G | N | G | C1 OR C3 | GNG |
| 6 | D | G | G | !C1 AND (C2 OR C3) | DGG |
| 7 | D | G | D, N | !C1 AND C2 | DG_ |
| 8 | D | D | G | !C1 AND !C2 AND C3 | DDG |
| 9 | D, N | D, N | D, N | False | ___ |
| 10 | D | N | G | !C1 AND C3 | DNG |
| 11 | N | G | G | C2 OR C3 | NGG |
| 12 | N | G | D, N | C2 | NG_ |
| 13 | N | D | G | !C2 AND C3 | NDG |
| 14 | N | N | G | C3 | NNG |

Table D shows 14 distinct normalized cursor predicates and corresponding authorization contexts, where '_' represents an authorization result that may be either a D or an N. Thus, where there is a single requested privilege and three ACL-data realm pairs, the number of possible distinct authorization contexts (and, therefore, child cursors) is reduced almost in half from 27 to 14.

One normalization that may be performed on a cursor predicate is (1) identifying a portion of the cursor predicate that includes an inverted data realm predicate that is AND'd with a False and (2) replacing that portion with a false. Thus, "!CN AND False" becomes "False."

Another normalization that may be performed on a cursor predicate is (1) identifying a portion of the cursor predicate that includes a data realm predicate that is OR'd with a False and (2) replacing that portion with the data realm predicate. Thus, "CN OR False" becomes "CN."

To be able to perform these normalizations, the data realm predicates are written in post-order in a recursive call or from right to left (reverse) in the ordered list. This reduces the cursor predicates when the following two conditions are found in the trailing part of the cursor predicate lists:
AND FALSE
OR FALSE By applying these two normalizations to a subset of the cursor predicates in Table C, the number of possible rewrites (and corresponding authorization contexts) is reduced from 27 to 14. Accordingly, if cursor predicates are used to determine whether a child cursor may be shared for an incoming database statement, then less child cursors may need to be searched. Even if the cursor predicates are not used to determine whether a child cursor may be shared, a shorter cursor predicate is better for a query optimizer to generate a more efficient execution plan.

Privilege Predicate Removal

When multiple privileges are checked within a database statement, the result is a rewrite (or set of predicates) for each privilege check. Applying a privilege to multiple ACL-data realm pairs results in a privilege authorization context that indicates an authorization result for each ACL of the ACL-data realm pairs. The privilege authorization context is used to generate a predicate (referred to as a privilege predicate) that comprises zero or more data realm predicates, some of which may be inverted (or "NOT'd"). Thus, if there are two privileges associated with a database statement, then two privilege predicates will result.

However, there are cases when multiple privilege predicates for a database statement (or cursor) represent a single logical predicate based on algebraic normalization. For example, a data security policy on a table contains three ACL-data realm pairs:
{a1, C1, a2, C2, a3, C3}

In both of the following cases, there are two privileges requested. In the first case, a user is granted privilege p1 on all ACLs (i.e., a1-a3) and is granted privilege p2 on only a1 and a2. Thus:

CHECK_PRIVILEGE{p1, p2}, a1, C1, a2, C2, a3, C3) =

(C1 or C2 or C3) AND (C1 or C2) = (C1 or C2)

Here, the first privilege predicate (i.e., "C1 or C2 or C3") is removed entirely.

In the second case, a user is granted p1 on only a1 and a2 and p2 on all ACLs. Thus:

CHECK_PRIVILEGE{p1, p2}, a1, C1, a2, C2, a3, C3) =

(C1 or C2) AND (C1 or C2 or C3) = (C1 or C2)

Here, the second privilege predicate (i.e., "(C1 or C2 or C3)") is removed entirely. In both cases, one of the privilege predicates is removed from the final rewrite. Thus, if cursor predicates are used to determine whether a child cursor may be shared for an incoming database statement, then the number of cursors may be reduced when two privileges are checked within a database statement since two different sets of privilege predicates may be mapped to a single common privilege predicate.

As long as there are no negative grants (or Ds) for either privilege check, then multiple privilege predicates may be reduced to a single privilege predicate that only includes (positive or non-inverted) data realm predicates that are found in each privilege predicate. For example, if a first privilege predicate is (C1 or C2), a second privilege predicate is (C1 or C2 or C3), and a third privilege predicate is (C2 or C3), then a combined privilege predicate that represents the conjunction of all three privilege predicates is C2, since C2 is a positive grant (G) found in each privilege predicate and none of the three privilege predicates includes a negative grant (D).

Efficiently Evaluating an Authorization Context

As noted previously, under predicate normalization, the right-most authorization results of deny (D) and neither (N) do not contribute any predicates to the final rewrite due to the following two normalizations:
!CN AND False=False
CN OR False=CN To achieve this, in an embodiment, ACL-data realm pairs are evaluated from right (corresponding to least priority pair) to left (corresponding to increasingly higher priority pairs) one by one. If the authorization result of a ACL-data realm pair is D or N, then the authorization results is interpreted as '_'. When the right-to-left evaluation identifies a G, the authorization result is written into a bit vector for the authorization context. Any remaining Ds and/or Ns in the right-to-left evaluations are recorded as D or N. Such remaining Ds and Ns are no longer replaced with '_' (or other value that represents either D or N). This is due to the fact that ACL-data realm pairs are ordered from left to right based on decreasing priority. However, after the last G, the data realm predicates that corresponding to the remaining Ds or Ns do not contribute to the final rewrite.

For example, if a data security policy for a table includes twenty ACL-data realm pairs and the last grant corresponds to the ninth ACL-data realm pair in the data security policy, then the authorization context may be "G G D G N N D G G _ _ _ _ _ _ _ _ _ _ _". If (1) a bit vector for that authorization context includes two bits for each authorization result and (2) a G is '11', a D is '00', an N is '10' and a '_' is '01', then the bit vector may be forty bits long and include the following bit sequence: 1111001110100011110101010101010101010101.

Alternatively, instead of '01' for N, the bits after the last grant may be anything, such as all 0s or all 1s. However, the cursor predicate (which is used to execute the database statement) of the child cursor would still not reflect data realm predicates for any trailing Ds or Ns. Also, the cursor may store last grant data that indicates which authorization result corresponds to the last grant. This last grant data may be used to determine which bits in the bit vector must be the same (i.e., all authorization results before and including the last grant) and which bits may be ignored (i.e., all authorization results after the last grant).

The same computation logic is used in generating bit vectors for incoming database statements as well as database statements for which a hard parse was performed, so that incoming database statements might share a child cursor that stores (or is otherwise associated with) a similarly-constructed bit vector.

Therefore, in one embodiment, a G G N authorization context of an incoming database statement would not match a G G D authorization context of a child cursor and, therefore, the child cursor would not be used to execute the incoming database statement. In another embodiment, a G G N authorization context of an incoming database statement is rewritten as G G _, which is matched against a G G _ authorization context of a child cursor, resulting in a match, even though the original authorization context of the child cursor was a G G D, which does not match the original G G N authorization context of the incoming database statement.

Removing One or More Privilege Authorization Contexts

A database statement may be associated with multiple privileges, such as a viewMyRecords privilege and a select privilege. Each privilege is applied to the data security policy of a database object. Thus, if there are three ACL-data realm pairs, then an authorization result is determined twice for each ACL-data realm pair, one for each privilege. In other words, an authorization context is determined for each privilege. Thus, if there are three privileges associated with a database statement, then three authorization contexts are generated. Each authorization context for a different privilege is referred to as a "privilege authorization context." If authorization context is used to determine whether to share cursors, then the more privilege authorization contexts that are stored for a single cursor, the less likely a cursor will be shared. Therefore, reducing the number of privilege authorization contexts for a database statement may result in decreasing the number of child cursors for a particular data statement, which may translate into increasing the sharing of existing child cursors.

In an embodiment, one or more privilege authorization contexts are removed and the remaining authorization context(s) are stored in (or in association with) a cursor. Two privilege authorization contexts are compared to determine whether one of them may be eliminated. One criterion that may be used to determine whether a privilege authorization context may be eliminated is that none of the privilege authorization contexts can have any deny authorization results.

For example, a first privilege authorization context for a database statement is G G N for ACLs a1, a2, and a3, respectively. A second privilege authorization context for the database statement is G G G for ACLs a1, s2, and a3, respectively. The grant authorization results in the first privilege authorization context and the grant authorization results in the second privilege authorization context have a common subset. Only users with this common subset result can access the corresponding cursor. Thus, the common authorization context is stored with a cursor for the database statement. Additionally, the common authorization context now represents grants for both privileges instead of just one. In other words, both privileges are granted to the first two data realms.

Later, a second database statement is received, which is associated with the same two privileges. However, the first privilege authorization context is G G G and the second privilege authorization context is G G N. The grant authorization results in the second privilege authorization context and the grant authorization results in the first privilege authorization context have a common subset. Thus, the common privilege authorization context is stored in association with the database statement. Also, the common authorization context now represents grants for both privileges instead of just one. In other words, both privileges are granted to the first two data realms. Lastly, even though the original privilege authorization contexts of each database statement are different, the cursor for the first database statement may be shared for the second database statement since the common authorization context of the second database statement matches the common authorization context of the first database statement.

As another example, for a particular database statement, a first privilege authorization context is G N G, a second privilege authorization context is N G G, and a third privilege authorization context is N N G. Because there are no negative grants and the common grant in all three privilege authorization contexts corresponds to the last ACL, a single combined privilege authorization context for the three privilege authorization contexts is _ _ G. The '_' means that the authorization result for the corresponding ACL may be skipped or ignored. If the combined privilege authorization context is stored as N N G, then the authorization context of the next database statement must be N N G in order to share.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
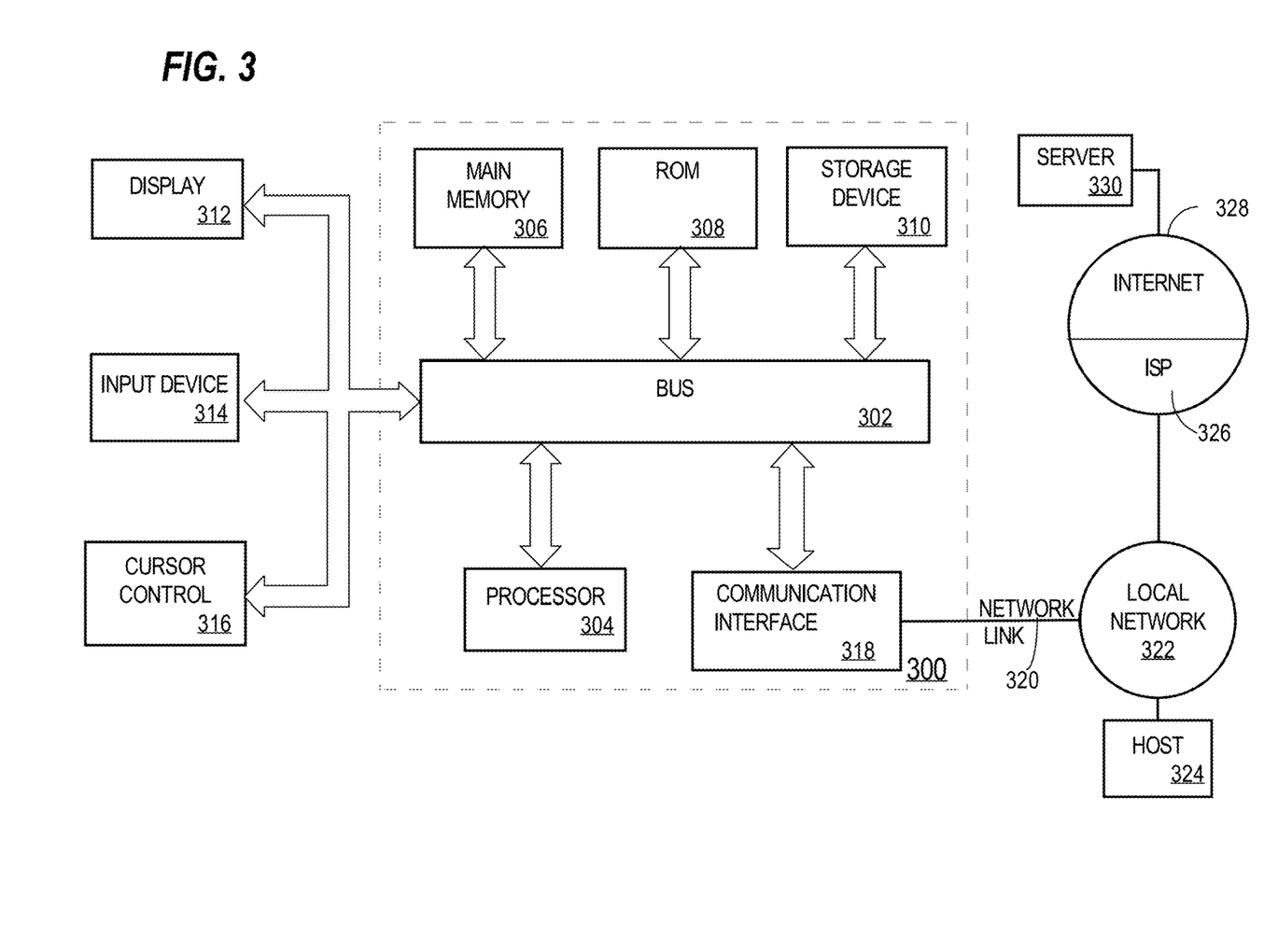
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, in association with a cursor for a first database statement, in a first bit vector, a first authorization context that indicates a first plurality of authorization results, wherein each authorization result in the first plurality of authorization results corresponds to a different data realm of a plurality of data realms;
   wherein each authorization result in the first plurality of authorization results corresponds to less than eight bits in the first bit vector;
   after storing the authorization context in association with the cursor, receiving a second database statement;
   in response to receiving the second database statement, generating a second authorization context that indicates a second plurality of authorization results, wherein each authorization result in the second plurality of authorization results corresponds to a different data realm of the plurality of data realms;

storing the second authorization context in a second bit vector;

wherein each authorization result in the second plurality of authorization results corresponds to less than eight bits in the second bit vector;

determining whether to use the cursor to execute the second database statement by comparing the second bit vector of the second authorization context to the first bit vector of the first authorization context.

2. The method of claim 1, further comprising:
storing, in a second cursor for a third database statement, a third authorization context that indicates a third plurality of authorization results, wherein each authorization result in the third plurality of authorization results corresponds to a different data realm of the plurality of data realms;
determining to not use the first cursor to execute the second database statement;
in response to determining to not use the first cursor to execute the second database statement, determining whether to use the second cursor to execute the second database statement by comparing the second authorization context to the third authorization context.

3. The method of claim 1, wherein one or more of the first plurality of authorization results is neither a grant or deny.

4. The method of claim 1, wherein a user that initiated the first database statement is different than a user that initiated the second database statement.

5. The method of claim 1, further comprising, prior to determining whether to use the cursor to execute the second database statement:
comparing the second database statement to the first database statement;
wherein comparing the second authorization context to the first authorization context is only performed after determining that second database statement is equivalent to the first database statement.

6. A method comprising:
in response to receiving a database statement, determining whether a user that initiated the database statement is authorized to access data from a plurality of data realms;
for each data realm of the plurality of data realms, determining an authorization result and generating a data realm predicate that reflects the authorization result;
wherein the data realm predicate is one of a plurality of data realm predicates generated for the database statement;
wherein a particular predicate comprises the plurality of data realm predicates;
performing one or more normalizations on the particular predicate to remove one or more data realm predicates from the plurality of data realm predicates to generate a normalized predicate that does not include the one or more data realm predicates;
generating an execution plan based on the normalized predicate and not based on the one or more data realm predicates.

7. The method of claim 6, wherein performing one of the one or more normalizations comprises:

identifying a portion of the particular predicate that comprises an inverted data realm predicate that is AND'd with a false predicate;
replacing the portion of the particular predicate with the false predicate.

8. The method of claim 6, wherein performing one of the one or more normalizations comprises:
identifying a portion of the predicate that comprises a data realm predicate that is OR'd with a false predicate;
replacing the portion of the predicate with the data realm predicate.

9. A method comprising:
in response to receiving a database statement:
determining that the database statement requests a first privilege and a second privilege that is different than the first privilege, wherein the first privilege is one of a select, insert, update, or delete;
for the first privilege, generating a first privilege predicate that indicates, for each predicate in the first privilege predicate, an authorization result that pertains to a different data realm of a first set of two or more data realms;
for the second privilege, generating a second privilege predicate that indicates, for each predicate in the second privilege predicate, an authorization result that pertains to a different data realm of a second set of one or more data realms that is included in the first set of two or more data realms;
wherein the first privilege predicate is different than the second privilege predicate;
based on a comparison between the first privilege predicate and the second privilege predicate, storing at least a portion of the second privilege predicate in association with a cursor for the database statement without storing the first privilege predicate in association with the cursor, wherein the portion of the second privilege predicate is used to determine whether to share the cursor with a subsequent database statement.

10. The method of claim 9, further comprising:
determining that the database statement is also associated with a third privilege that is different than the first privilege and the second privilege;
for the third privilege, generating a third privilege predicate that indicates, for each predicate in the third privilege predicate, an authorization result that pertains to a different data realm of a third set of one or more data realms that is included in the first set of two or more data realms;
wherein the third privilege predicate is different than the second privilege predicate and the first privilege predicate;
based on a comparison between the third privilege predicate and the second privilege predicate, determining to not add the third privilege predicate to the database statement.

11. The method of claim 9, further comprising:
generating an execution plan based on the database statement that includes the portion of the second privilege predicate.

12. A method comprising:
storing a data security policy that comprises a plurality of pairs, each of which is an association between an access control list and a data realm, wherein the plurality of pairs have a first order;
in response to receiving a database statement, generating a plurality of authorization results, each of which is a result of applying a privilege associated with the database statement to a different access control list in the plurality of pairs;
wherein the plurality of authorization results are ordered based on the first order;
wherein each authorization result in the plurality of authorization results is one of a grant, a deny, or a neither grant nor deny;
based on the first order, identifying the last grant in the plurality of authorization results;
wherein each authorization result, in the plurality of authorization results, that is after the last grant is either a deny or a neither grant nor deny;
generating an authorization context for the database statement based on the last grant;
storing the authorization context in a cursor for the database statement.

13. The method of claim 12, wherein generating the authorization context comprises:
determining that a set of authorization results, of the plurality of authorization results, that succeed the last grant do not contribute to a final rewrite of the database statement.

14. The method of claim 13, wherein generating the authorization context comprises:
for each authorization result in the set of authorization results, storing, in the authorization context, a value that indicates that said each authorization result is either (a) a deny or (b) neither a grant nor deny.

15. The method of claim 14, wherein, for said each authorization result, the value does not indicate whether said each authorization result is a (a) deny or (b) neither grant nor deny.

16. The method of claim 12, wherein the plurality of authorization results is a first plurality of authorization results, wherein the authorization context is a first authorization context, further comprising, after storing the authorization context in the cursor for the database statement:
in response to receiving a second database statement, generating a second plurality of authorization results, each of which is a result of applying a privilege associated with the second database statement to a different access control list in the plurality of pairs;
wherein the second plurality of authorization results are ordered based on the first order;
wherein the second plurality of authorization results is different than the first plurality of authorization results;
based on the first order, identifying the last grant in the second plurality of authorization results;
generating a second authorization context for the database statement based on the last grant in the second plurality of authorization results;
determining whether to use the cursor to execute the second database statement by comparing the second authorization context to the first authorization context.

17. The method of claim 16, wherein:
the first plurality of authorization results comprises a first set of authorization results that are after the last grant in the plurality of authorization results;
the second plurality of authorization results comprises a second set of authorization results that are after the last grant in the second plurality of authorization results;
the first set of authorization results do not match the second set of authorization results;
the method further comprising determining that the second authorization context matches the authorization context.

18. A method comprising:
storing a data security policy that comprises a plurality of pairs, each of which is an association between an access control list and a data realm, wherein the plurality of pairs have an order;
in response to receiving a database statement, determining that the database statement requests a plurality of requested privileges, one of which includes a select, insert, update, or delete;
for each privilege of the plurality of requested privileges, generating an authorization context that indicates a plurality of authorization results, each of which is a result of applying said each privilege to a different access control list in the plurality of pairs;
wherein the plurality of requested privileges includes a first privilege and a second privilege;
wherein the first privilege corresponds to a first authorization context and the second privilege corresponds to a second authorization context;
comparing the first authorization context to the second authorization context to determine whether either the first authorization context or the second authorization context can be removed;
determining to remove the first authorization context;
storing at least a portion of the second authorization context in association with a cursor for the database statement without storing the first authorization context in association with the cursor, wherein the portion of the second authorization context is used to determine whether to share the cursor with a subsequent database statement.

19. The method of claim 12, wherein each authorization result, in the plurality of authorization results, that is after the last grant is not used in determining whether to share the cursor for another database statement.

* * * * *

UNITED STATES PATENT AND TRADEMARK OFFICE
CERTIFICATE OF CORRECTION

| | | |
|---|---|---|
| PATENT NO. | : 10,102,355 B2 | Page 1 of 2 |
| APPLICATION NO. | : 14/313872 | |
| DATED | : October 16, 2018 | |
| INVENTOR(S) | : Ahmed et al. | |

It is certified that error appears in the above-identified patent and that said Letters Patent is hereby corrected as shown below:

On the Title Page

Delete the title page and substitute therefore with the attached title page.

In the Specification

In Column 1, Line 4, above "FIELD OF THE DISCLOSURE" insert
-- CROSS-REFERENCE TO RELATED APPLICATIONS
This application is related to U.S. Application No. 13/488,739, filed June 5, 2012, the entire contents of which hereby incorporated by reference as if fully set forth herein. --.

In Column 10, Line 9, delete "Flase)" and insert -- False) --, therefor.

In the Claims

In Column 20, Line 50, in Claim 19, below "statement." insert
-- 20. One or more non-transitory storage media storing instructions which, when executed by one or more processors, cause performance of the method recited in Claim 1.

21. One or more non-transitory storage media storing instructions which, when executed by one or more processors, cause performance of the method recited in Claim 6.

22. One or more non-transitory storage media storing instructions which, when executed by one or more processors, cause performance of the method recited in Claim 9.

23. One or more non-transitory storage media storing instructions which, when executed by one or more processors, cause performance of the method recited in Claim 12.

24. One or more non-transitory storage media storing instructions which, when executed by one or more processors, cause performance of the method recited in Claim 19. --.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*

(12) United States Patent
Ahmed et al.

(10) Patent No.: US 10,102,355 B2
(45) Date of Patent: Oct. 16, 2018

(54) OPTIMIZED ENFORCEMENT OF FINE GRAINED ACCESS CONTROL ON DATA

(71) Applicant: Oracle International Corporation, Redwood Shores, CA (US)

(72) Inventors: Tanvir Ahmed, Hayward, CA (US); Yi Ru, Belmont, CA (US); Chao Liang, San Ramon, CA (US); Vikram R. Pesati, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 818 days.

(21) Appl. No.: 14/313,872

(22) Filed: Jun. 24, 2014

(65) Prior Publication Data
US 2015/0371018 A1 Dec. 24, 2015

(51) Int. Cl.
*G06F 21/30* (2013.01)
*G06F 17/30* (2006.01)
*G06F 21/62* (2013.01)

(52) U.S. Cl.
CPC ........ *G06F 21/30* (2013.01); *G06F 17/30448* (2013.01); *G06F 21/6218* (2013.01); *G06F 21/6227* (2013.01); *G06F 2221/2141* (2013.01)

(58) Field of Classification Search
CPC .. G06F 21/30; G06F 21/6218; G06F 21/6227; G06F 17/30448; G06F 2221/2141
See application file for complete search history.

(56) References Cited

U.S. PATENT DOCUMENTS

| 9,043,309 | B2 * | 5/2015 | Ahmed | G06F 17/30448 |
| | | | | 707/713 |
| 2003/0187848 | A1 | 10/2003 | Ghukasyan et al. | |
| 2003/0212670 | A1 * | 11/2003 | Yalamanchi | G06F 17/2241 |
| 2005/0246338 | A1 * | 11/2005 | Bird | G06F 21/6227 |

(Continued)

FOREIGN PATENT DOCUMENTS

EP 1564620 A1 1/2005

OTHER PUBLICATIONS

U.S. Appl. No. 13/488,739, filed Jun. 5, 2012, Notice of Allowance dated Aug. 28, 2014.

*Primary Examiner* — Michael Pyzocha
(74) *Attorney, Agent, or Firm* — Hickman Palermo Becker Bingham LLP; Daniel D. Ledesma

(57) ABSTRACT

Techniques for efficient cursor sharing to enforce fine-grained access control are provided. In one technique, the authorization context of a database statement is stored in (or in association with) a corresponding cursor. The authorization context indicates multiple authorization results, each of which indicates whether a user (or role) associated with the database statement is allowed to access a different data set of multiple data sets that the database statement targets. An authorization context of an incoming database statement may be compared to the authorization context of a cursor in a single comparison to determine whether the authorization contexts match. If so, then the cursor may be shared. In another technique, one or more normalizations are applied to a cursor predicate that is generated based on the authorization context of a database statement. The one or more normalizations may result in removing one or more predicates from the cursor predicate.

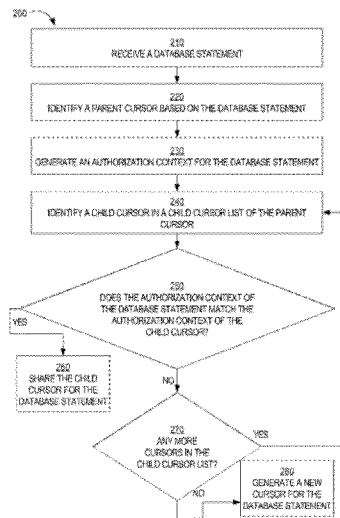

24 Claims, 3 Drawing Sheets